Patented Dec. 25, 1945

2,391,559

UNITED STATES PATENT OFFICE 2,391,559

BEVERAGE

June E. Faulkner, Chicago, Ill.

No Drawing. Application December 18, 1941,
Serial No. 423,471

2 Claims. (Cl. 99—57)

This invention relates to a beverage and a process of making the same. More specifically, this invention relates to a nonalcoholic beverage which is capable of producing a head, collar or foam when the beverage is poured into a glass or other suitable container.

It is an object of this invention to provide a beverage containing pure ingredients which has the characteristic of forming a head, collar or foam when the beverage is poured into a glass or receptacle from which the beverage is drunk. A well known characteristic of certain alcoholic beverages, such as beers and ales, is that they have the property of producing a desirable head, collar or foam when the beverage is poured into a glass. This foam imparts a pleasing appearance to the beer or ale and tends to impart palatability to the product. It is an object of this present invention to provide a nonalcoholic soft drink, carbonated or noncarbonated, which will likewise have a tendency to foam when the beverage is poured into a container.

In the past it has been proposed to add certain materials to soft drinks such as root beer which will cause the formation of a head, collar or foam on the beverage when it is poured into a receptacle. Substances that have been suggested for incorporation into the beverage for this purpose are such materials as acacia gum, soapbark, saponin, licorice, certain types of caramel, and substances derived from cactus plants. None of these ingredients suggested in the prior art are entirely satisfactory, however, because the foam produced by them has a tendency to disappear from the surface of the beverage quite rapidly. Also the use of certain of these products is barred by pure food and drug laws. Another undesirable feature that is attendant to the use of some of the above mentioned foaming ingredients is that they each have their own individual taste, aroma or bouquet which is undesirable in the final product.

It has also been proposed in the past to impart foaming characteristics to nonalcoholic beverages by the addition of such materials as egg albumin thereto. However, the incorporation of albumins of this nature has not been entirely satisfactory for the reason that the albumin has a tendency to form a precipitate in the final product. Such precipitates are very undesirable in a beverage which should normally be sparkling clear.

Consequently it is an object of this invention to provide a beverage having foaming characteristics imparted thereto by means of a pure food substance which does not impart a peculiar taste, aroma or bouquet to the resulting product or which does not tend to precipitate in the final product. A further object of this invention is the provision of a new concentrate which may be employed for the preparation of carbonated or noncarbonated beverages.

A further object of this invention is the provision of a method for preparing the above referred to concentrate.

Further and additional objects will appear from the following description and the appended claims.

In accordance with this invention, it has been found that a beverage capable of producing a foam or head when poured may be prepared by incorporating into the beverage or into the ingredients which go to make up the beverage a water soluble protein derivative obtained from milk whey. This protein derivative may be obtained from the whey by direct concentration and drying of the whey itself or it may be obtained from a whey product which has been treated, purified or reprecipitated by any of the well known prior art methods.

In accordance with the process of this invention a suitable dried whey product is first dissolved in an aqueous alkaline solution having a quantity of salt dissolved therein. After the whey has been thoroughly dissolved in the aqueous alkaline salt solution the solution is then neutralized by the addition thereto of an organic acid to about pH 7. This mixture is thoroughly stirred and then additional quantities of acid, preferably an organic acid such as citric acid, are added thereto to the point where the concentration of the acid is sufficient to give the desired taste appeal to the final product. After acidification of the whey derivative solution the solution is then filtered in order to remove quantities of salts or proteins that may have been precipitated. This clear filtrate is then admixed with any desired flavoring ingredients, essential oils, tinctures, fruit juices, herb flavorings, etc., to produce a desired concentrate. This concentrate may be admixed with sugar or simple syrup to provide a flavored syrup from which the beverage is to be produced.

It will be clear from what has been said in the foregoing that any type of nonalcoholic beverage may be produced in accordance with this process, such as for example, beverages known in the trade as root beer, ginger ale, lime or cherry soda, etc. However, in order to more specifically point out a process for preparing a soft drink in accordance with my invention, I will now describe a method by which a root beer may be produced having the desired foaming characteristics. It will of course be understood that my invention is not to be limited to the specific ingredients and the proportions given in the example that is to follow.

An aqueous alkaline solution is first prepared by dissolving 1.39 pounds of sodium hydroxide and 2.78 pounds of sodium chloride in 18.79 gallons of water. Into this solution is thoroughly incorporated about 50 pounds of a dried protein derivative obtained from milk whey. After the whey derivative has been thoroughly admixed with the aqueous alkaline salt solution, the solution is then neutralized to about pH 7 by the addition of a 50 per cent aqueous solution of citric acid thereto. In order to effect this neutralization, about 45.85 fluid ounces of the citric acid solution may be required. The amount, however, will in part depend on the characteristics of the whey derivative used. After neutralization with the citric acid, the resulting solution is further stirred and additional quantities of citric acid are added thereto. The amount of citric acid solution added at this point will depend upon the taste requirements of the beverage that is ultimately to be produced from the concentrate. In case it is desired to make a root beer from the concentrate, about 80 ounces of a 50 per cent citric acid solution are added after neutralization to effect the proper acidification. This addition of the excess citric acid will generally bring the pH of the solution down to between about pH 4 and 5.

After acidification with the excess acid, the solution is usually found to contain a precipitate and this precipitate is filtered therefrom in any desired manner. To produce a root beer concentrate, about 80 ounces of this filtrate is admixed with about 25 to 27 ounces of commercial caramel and to this mixture is added a gum oil emulsion containing suitable gums, herbs, herb flavoring ingredients, essential oils, essences, tinctures, fruit juices, fruit flavoring ingredients, etc. After these materials have been mixed together as indicated, the volume of solution obtained from 80 ounces of whey filtrate is about one gallon. This gallon of solution is known as the concentrate which may be employed for the manufacture of root beer. One gallon of concentrate is admixed with 8 gallons of simple syrup to produce a flavored syrup product which may be diluted with water to form the desired beverage. In accordance with this invention, about two ounces of the above indicated flavored syrup containing the whey protein derivative may be diluted to about 12 ounces with water and the resulting solution may be carbonated with about 3.2 to 3.5 volumes of gas (60° F.) in accordance with the well known processes.

The carbonated root beer produced in accordance with the method indicated above has a pleasant creamy taste and when poured into a glass will form a head which will stand for a relatively long period of time. This head is full and creamy and does not have a tendency at once to disperse and fall back to the surface of the beverage in the glass. An important feature of the beverage is that the foaming properties are imparted thereto by a pure and nutritious substance obtained from milk. It does not have a tendency to impart undesirable tastes, aromas or bouquets to the resulting beverage.

It will be understood of course that I do not wish to limit myself to the particular ingredients specified above for treating the whey product to produce the concentrate of my invention. For example, the whey derivative may be initially dissolved in aqueous solutions other than sodium hydroxide, suitable alkaline materials being potassium hydroxide, sodium carbonate, ammonium hydroxide, basic organic compounds or the like. Also acids other than citric acid may be employed for the neutralization of the alkaline solution of the whey derivative. For example, tartaric acid, phosphoric acid, mono-chloracetic acid or other acids suitable for use in a food product may be employed. However, in general I prefer to use citric acid since citric acid and the citrates contribute to the desired taste qualities of the resulting product.

In the foregoing a method has been described wherein the whey product is first solubilized in alkali before acidification. Under certain conditions and with certain whey products, it has been found that the whey product may be dissolved directly in an acid solution to produce a concentrate suitable for use in a beverage in accordance with this invention.

The concentrate containing the whey protein derivative and the flavoring ingredients may be separately prepared and packaged and separately sold. The consumer, who may be a soft drink bottler, may then admix the concentrate with sugar or simple syrup and dilute with water and carbonate to produce the desired beverage as above indicated. Also if desired, the sugar or simple syrup may be incorporated in whole or in part with the flavored concentrate and packaged and sold as desired. The concentrate sweetened or unsweetened may be used by a soft drink bottler or it may be sold as a fountain syrup or in packages for use by the ultimate consumer in the home. As pointed out above, an important feature of the concentrate produced in accordance with this invention is that a carbonated or non-carbonated beverage may be produced therefrom which does not contain a precipitate resulting from the whey protein derivative incorporated thereinto.

I have, in the foregoing, described my invention with particular reference to a process of preparing a carbonated nonalcoholic beverage. It will be understood, of course, that, in accordance with this invention, the protein derivative from whey may also be incorporated with noncarbonated beverages or alcoholic beverages such as beer and ale to enhance the foam producing properties thereof.

While a particular embodiment of this invention is shown above, it will be understood, of course, that the invention is not to be limited thereto, since many modifications may be made as will readily appear to one skilled in the art.

I claim:
1. Process of making a palatable and potable water solution of a foaming agent suitable for incorporation in beverages which comprises dissolving milk whey protein in an aqueous solution of sodium hydroxide and sodium chloride containing about 0.60% NaOH and about 1.30% NaCl, acidifying the resulting solution with a non-poisonous acid to a pH of about between 4 and 5, thereby precipitating undesired proteinaceous components, and separating said components from the solution.

2. The process of claim 1 in which the acidification of the protein solution is effected by means of citric acid.

JUNE E. FAULKNER.